July 15, 1924.
J. A. HEPPERLEN
1,501,661
APPARATUS FOR AND SYSTEM OF MOTOR CONTROL
Filed Feb. 19, 1923
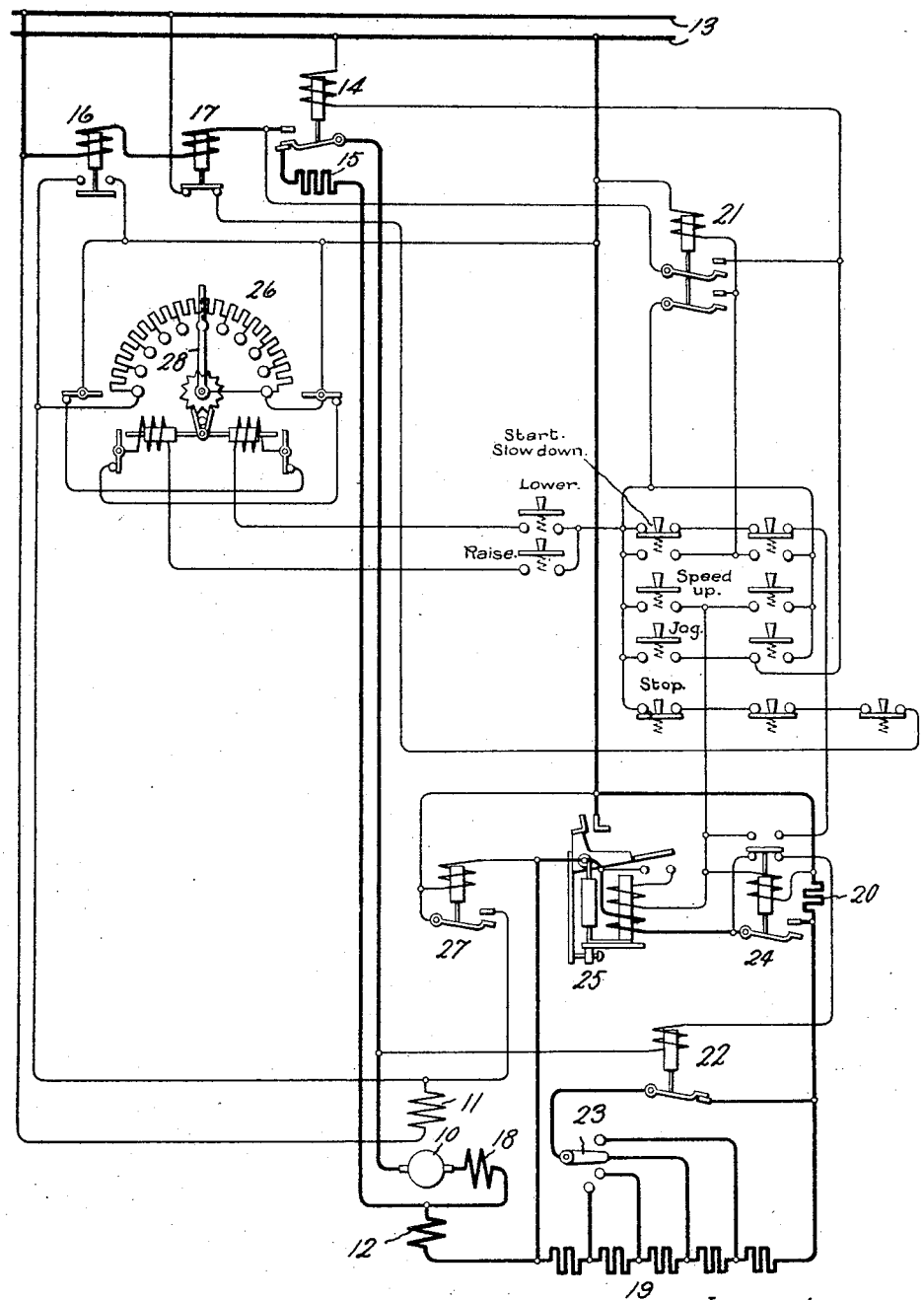
Inventor:
John A. Hepperlen,
by Alexander F. Lunt
His Attorney Patented July 15, 1924.

1,501,661

UNITED STATES PATENT OFFICE.

JOHN A. HEPPERLEN, OF EAST ORANGE, NEW JERSEY, ASSIGNOR TO GENERAL ELECTRIC COMPANY, A CORPORATION OF NEW YORK.

APPARATUS FOR AND SYSTEM OF MOTOR CONTROL.

Application filed February 19, 1923. Serial No. 619,836.

*To all whom it may concern:*

Be it known that I, JOHN A. HEPPERLEN, a citizen of the United States, residing at East Orange, in the county of Essex, State of New Jersey, have invented certain new and useful Improvements in Apparatus for and Systems of Motor Control, of which the following is a specification.

This invention relates to apparatus for and a system of motor control whereby an electric motor may be started and stopped and generally controlled in a safe, reliable, simple and effective manner.

One of the objects of the invention is to provide a control for an electric motor whereby the speed of the motor may be varied through a comparatively wide range by the manipulation of a comparatively few push buttons or other manually operable master switch mechanism.

Another object of the invention is to provide a control for an electric motor whereby the wide range of speeds is obtained without the necessity of a power operated remotely controlled master switch, such for example, as a manually controlled pilot motor operated or controlled speed varying controller as used in a "full automatic" type of control.

Another object of the invention is to provide an improved arrangement whereby a predetermined maximum speed of the motor is obtained at a rate of acceleration which is controlled by means responsive to an operating condition of the motor or the motor circuits, as for example, controlling the rate of acceleration of the electric motor in accordance with the current taken by the motor.

A further object of the invention is to provide an improved system of motor control in which a "start" push button, or other manually operable master switch for controlling the starting of the motor, may also be used as a "slow down" button, so that this single switch serves the double purpose of controlling the starting of the motor and of decreasing the motor speed after the motor has started.

A further object of the invention is to provide an arrangement involving the use of push buttons which may be biased to one position and automatically returned thereto when the pressure on the push button is released, thus making it unnecessary to reset the button or buttons before being able to operate as is the case where snap switches are used for the control of the electric motor, and eliminating the necessity for the use of "shutters" on the push buttons for maintaining the push buttons in their operated positions.

Although my invention is not necessarily limited thereto it has a particular application in the control of the electric driving motor or motors for a color printing press. Ordinarily, the practical conditions imposed do not require the operation of these presses at any more than either of two definite speeds. Thus, ordinarily, it is sufficient that a slow or threading speed be provided for and the full running speed. In accordance with my invention, a "full automatic" type of controller for controlling the motor or motors of color printing presses is dispensed with, and the very much simpler arrangement of my invention serves the purpose equally well and nevertheless has a number of advantages from the standpoint of simplicity of construction and arrangement, and therefore a greater reliability of operation. These and other objects of the invention, as will be either apparent to those skilled in the art or as will be pointed out fully hereinafter, are attained in the apparatus for and the system of motor control which is illustrated in the very simple diagram of the accompanying drawing which has been provided for explaining the principles of the invention.

Referring to the drawing, the electric motor 10 is adapted to drive a load such, for example, as a color printing press, and this motor is controlled by apparatus and in a manner hereinafter set forth. This motor is indicated as of the type having a shunt field 11 and a series field 12, although in certain of the aspects of the invention the particular type of the motor used is not of the essence of the invention. This motor is arranged to be connected to the source of supply 13 by the line contactor 14, which is arranged in such a way that when open it establishes a dynamic braking circuit for the motor through a circuit including the resistor 15, and when energized to close to establish a circuit for the motor including the coil of the current limit acceleration relay 16, the coil of the overload relay 17, the motor armature, the commutating field 18, series field 12, the resistor 19, and the resistor 20. The motor may be controlled by the manually operable master switch mechanism which is indicated as a plurality of push buttons which are biased to their respective positions shown on the drawing. These push buttons comprise the "start" push button which, as will be explained hereinafter, may also be used as the "slow down" button, the "speed up" button, the "jog" button, and the "stop" button, which are indicated as such on the drawing. The push buttons above indicated are ordinarily combined into one push button station and are located at a convenient point about the press or other driven machine. As many of these push button stations as desirable may be located about the driven machine, and I have merely indicated two such stations, but I would have it understood that my invention is not necessarily limited to any particular number of the push button stations. The start relay 21 is provided for cooperating with the start push button for controlling the starting of the press for normal running or for running at a reduced speed. The normally closed electromagnetic switch 22 is provided for controlling a portion of the starting resistor 19 so as to short circuit either a portion or all of this resistor at starting so as to obtain a high starting torque for the motor and then to automatically open when the motor speed has increased to the proper value so as to automatically reinsert the portion of the starting resistor 19 which is determined by the adjustable switch 23, and thus obtain a predetermined operating speed. The high torque contactor 22 is connected so as to be energized responsively to the counter-electromotive force of the motor so as to thereby control the operation of this switch in accordance with the speed of the motor.

Contactor 24 is provided for short circuiting the entire starting resistor 19 and this contactor is under the control of the speed up push buttons as well as the start push button, as will be hereinafter explained. The contactor 25 is preferably of the well known "series contactor" type which is arranged to be magnetically held open when the current through the operating magnet winding is comparatively high and to magnetically close and be held closed magnetically when the current through the operating winding has dropped to a predetermined value. The series contactor 25 is arranged to short circuit the starting resistors 19 and 20 so as to thereby connect the motor directly to the supply circuit. It will be understood that the resistors 19 and 20 will ordinarily in practice be a single resistor with taps so that the contactors 22, 24 and 25 may short circuit the resistor in sections.

The rheostat 26 which is included in the shunt field circuit of the motor is under the control of the electromagnetic relay 27 which is energized to short circuit the shunt field rheostat 26 until the motor has been connected directly to the supply circuit by the closing of the series contactor 25. The arrangement is such that when the contactor 25 closes, the winding of the relay 27 is short circuited so that this relay will open, thereby inserting the portion of the resistance of the rheostat 26 in the shunt field circuit of the motor, as determined by the position of the ratchet operated rheostat arm 28. This rheostat arm is adapted to be ratcheted back and forth by the electromagnetic operating means indicated so as to thereby vary the resistance in the shunt field circuit of the motor and thus vary the normal full running speed of the motor. The electromagnetic ratcheting mechanism is under the control of the push buttons which are indicated "lower" and "raise." The arrangement is such that when the "lower" push button is pressed, the electromagnetic ratcheting mechanism is operated to decrease the value of the resistance of the rheostat 26, and when the "raise" push button is depressed, to increase the value of the resistance of the rheostat which is included in the motor field circuit so as to thereby control the speed of the motor.

As thus constructed and arranged, and with the parts in their respective positions shown in the drawing, the operation of my invention is as follows: Assume that it is desired to "jog" the press, that is, start the press and operate at a comparatively low speed, the jog push button will be depressed, thereby energizing the winding of the line contactor 14 through a circuit which may be traced from the upper supply conductor, contacts of the overload relay 17, stop push buttons, through the contacts of the particular jog push button which has been pressed, the winding of the line contactor, to the lower supply conductor. The motor armature will be connected to the source of supply by the closing of the line contactor 14, and the resistor comprising the sections 19 and 20 will be included in the motor armature circuit. The high torque contactor 22 will short circuit the predetermined portion of the resistor section 19 so as to obtain a high torque for the motor at starting. As soon as the motor speed has increased, this contactor will automatically open, thereby reinserting all of the resistor section 19 in the motor armature circuit. The motor will be disconnected from the source of supply and included in a dynamic braking circuit which includes the braking resistor 15 when the jog push button is released. This provides for operating the motor at a reduced speed for the preliminary operations of making up the press. The high torque contactor 22 provides for effecting a high motor torque at starting in order to permit the load driven by the motor to start, and by reason of the fact that this contactor will open after the motor has increased in speed, the motor speed is thereby automatically limited to a predetermined reduced speed.

In order to start the motor for operation in the normal manner or to start the motor so as to operate continuously at a reduced speed, the start push button is momentarily depressed so that the contact mechanism of this push button will make engagement with its lower set of contacts. This will effect the energization of the start relay 21, which in closing completes the circuit for the winding of the line contactor 14 and also establishes a maintaining circuit for the relay winding so that the start push button may be released to return into engagement with its upper set of contacts. The motor will now operate in the manner previously explained in connection with the operation of the jog button, but in this case the motor will continue to run after the start button has been released. If it is desired to increase the speed of the motor, the speed up button is momentarily depressed, thereby energizing the resistor contactor 24 to close and short circuit the resistor section 19. When the resistor contactor 24 closes, it opens the winding circuit of the high torque contactor 22 at the lower auxiliary contacts and closes a circuit through the upper auxiliary contacts, so that the winding of the contactor 20 is maintained energized through a circuit which includes the upper contacts of the start push button. It will also be observed that the closing of the resistor contactor 24 has energized the series operating coil of the current limit accelerating contactor 25. This contactor will be magnetically held open when the motor current is high, and when the motor current is reduced to the predetermined value, the contactor will be magnetically closed so as to short circuit the entire starting resistor and connect the motor armature directly to the supply circuit for full speed operation. When the contactor 25 closes, it short circuits the series operating coil thereof, but the contactor is maintained closed by reason of the fact that the shunt coil of this contactor is energized when the switch is closed so as to magnetically hold the switch in the closed position.

Assume that it is now desired to decrease the motor speed. This may be done by momentarily depressing the start push button so as to thereby deenergize the resistor contactor 24. The resistor contactor 24 will thus open and the shunt holding winding of the series contactor 25 will be deenergized by reason of the fact that the shunt winding of this contactor was maintained energized through the upper auxiliary contacts of the resistor contactor 24. The high torque contactor 22 will be energized to open by reason of the fact that the motor speed is above the predetermined value so that the resistor sections 19 and 20 are included in the motor armature circuit. The motor is thus caused to operate at the predetermined reduced speed. In order to stop the motor after the motor has been started by any of the means provided, the spring return stop push button is momentarily depressed, thereby deenergizing the line contactor 14, disconnecting the motor from the source of supply, and connecting the motor armature in a dynamic brake circuit.

It will be observed that the shunt field rheostat 26 is automatically short circuited when the motor is first connected to the supply circuit by reason of the fact that the field relay 27 will simultaneously close with the closing of the line contactor 14. As soon as the series contactor 25 closes, however, the winding of the relay 27 is short circuited so that this relay will open and insert the portion of the resistance of the rheostat 26 in the motor field circuit as determined by the setting of the rheostat arm 28. The current limit relay 16 will automatically effect the acceleration of the motor to the full running position in accordance with the current taken by the motor by reason of the fact that this relay will alternately short circuit shunt field rheostat 26 and open the shunt until the motor has accelerated to the full running speed and the current taken by the motor has dropped to the normal full load current of the motor. If it is desired that the motor speed shall be increased, the push button marked "raise" is depressed, thereby energizing the associated electromagnet of the electromagnetically controlled ratchet arrangement so as to increase the value of the resistance of the rheostat 26 which is included in the shunt field circuit of the motor. In order to decrease the motor speed by shunt field control, the push button marked "lower" is depressed so as to control the electromagnetically operated ratcheting arrangement so as to cut out the resistance in the motor field circuit. Inasmuch as my invention is not limited to any particular type of controller for varying the speed of the motor by shunt field control, it is believed that those skilled in the art will readily understand this feature of the arrangement shown in the drawing, particularly because of the fact that the shunt field ratcheting controller is a diagrammatic representation of a type of controller well understood by those skilled in the art.

From the foregoing it will be seen that my invention provides a very simple and effective arrangement for starting and varying the speed of an electric motor by means of a comparatively few controlling devices. The start push button may also be used as a slow down button, and spring returned push buttons may be used throughout if desired. The advantage of a spring returned push button is that it is not necessary to reset the button before being able to operate, as in the case where a snap switch is used. Another advantage is that in starting the equipment the operator is not required to hold down the speed up or fast push button until the motor has accelerated to the desired speed, since in my arrangement by merely pressing the speed up push button momentarily the motor is automatically accelerated to the predetermined full running speed and the acceleration of the motor is effected in a safe, simple, and reliable manner. Another advantage of my arrangement is that the push button control wiring is so simple in arrangement that any desired number of push button stations may be provided for the control of the electric motor without introducing complications to provide against improper operation of the push buttons. In the drawing I have merely indicated two push button stations, but it will be obvious to those skilled in the art that the number of push button stations may be any number desired.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The combination in a system of motor control of a line contactor, electroresponsive switch mechanism for controlling the motor speed, two independently operable spring return push buttons for controlling the said line and speed controlling switch mechanism, and connections whereby the said line contactor is energized to close and remain closed to cause the motor to run at a reduced speed by momentarily depressing one of said push buttons and then releasing the same, the said speed controlling switch mechanism is energized to increase the motor speed by momentarily depressing and then releasing the second of said push buttons, and the speed of the motor is reduced by momentarily depressing the first of said push buttons.

2. The combination in a system of motor control of electroresponsive line switch mechanism, electroresponsive means for controlling the motor speed, a starting switch and a speed up switch, and connections whereby the line switch mechanism is energized to close when the starting switch is temporarily operated and is maintained closed when the starting switch is returned to its original position, and the said electroresponsive means is energized to effect an increase of the motor speed when the speed up switch is closed and then maintained energized through a circuit controlled by the starting switch when the speed up switch is opened.

3. The combination in a system of motor control of electroresponsive line switch mechanism, a manually operable starting switch biased to one position and operable to a second position to energize the said line switch mechanism to close and to be maintained closed when the starting switch is returned to its biased position, electroresponsive speed control switch mechanism and resistance in the motor circuit controlled thereby, a manually operable speed up switch biased to the open position for controlling the said switch mechanism, and connections whereby the said speed control switch mechanism is operated to short circuit a portion of the said resistance when the said speed up switch is temporarily closed and to then short circuit the entire resistance under the control of the motor current, and the said speed control switch mechanism is opened to reinsert a portion of the said resistance in the motor circuit when the said starting switch is moved from its biased position.

4. The combination in a system of motor control of a line contactor, a resistor for controlling the motor speed, a plurality of contactors for controlling the said resistor to vary the motor speed, two spring return push buttons for controlling the said line and resistor contactors, and connections whereby the motor is started to run at a predetermined reduced speed by momentarily depressing one of the said push buttons and then releasing the same, the speed of the motor increased and accelerated to full running speed in accordance with the motor current by momentarily depressing and then releasing the second of said push buttons, and the speed of the motor reduced to the said predetermined speed by momentarily depressing and then releasing the first of said push buttons.

5. The combination in a system of motor control of a resistor having a plurality of sections for controlling the motor speed, a normally closed high torque contactor for short circuiting a predetermined portion of one of the sections of said resistor and connected to open when the motor has attained a predetermined speed, a speed up contactor for short circuiting the entire section of the resistor controlled by the said high torque contactor, a contactor energized responsively to the closing of said speed up contactor and controlled responsively to the motor current for short circuiting the said resistor, a plurality of push buttons for controlling the said contactors, the said push buttons being biased to predetermined respective positions, and connections whereby the motor is started, the speed thereof is increased or decreased or the motor is stopped by selectively temporarily depressing the said push buttons against their bias.

6. The combination in a system of motor control of a line contactor, a resistor for controlling the motor speed, a plurality of contactors for controlling the same resistor to vary the motor speed, at least one of said resistor contactors connected to automatically operate in accordance with a motor operating condition, a spring return start button, a spring return speed up button, a spring return stop button, and connections whereby momentarily depressing the said start button connects the motor to a source of supply to run at a predetermined reduced speed, momentarily depressing the said speed up button energizes the resistor contactors to automatically accelerate the motor to full running speed, momentarily depressing the said start button deenergizes the said resistor contactors to decrease the speed of the motor to the said predetermined reduced speed, and momentarily depressing the said stop button disconnects the motor from the source of supply.

In witness whereof, I have hereunto set my hand this fifteenth day of February, 1923.

JOHN A. HEPPERLEN.